United States Patent [11] 3,622,616

[72] Inventors Michel Guerbet
 Paris;
 Guy Tilly, Drancy, both of France
[21] Appl. No. 685,847
[22] Filed Nov. 27, 1967
[45] Patented Nov. 23, 1971
[73] Assignee Laboratories Andre Guerbet
 Saint Ouen, France
[32] Priority July 10, 1967
[33] France
[31] 113715

[54] NEW BENZOIC ACID DERIVATIVES
 1 Claim, 2 Drawing Figs.
[52] U.S. Cl......................................................... 260/471 R,
 260/501.11, 260/519, 424/5
[51] Int. Cl.........................................................C07c 103/32
[50] Field of Search........................................... 260/471,
 501.11, 519, 471 R

[56] References Cited
UNITED STATES PATENTS
3,145,197 8/1964 Hoey............................. 260/518

Primary Examiner—Lewis Gotts
Assistant Examiner—L. Arnold Thaxton
Attorney—Young & Thompson ABSTRACT: 2,4,6-triiodo-3-(N-hydroxy ethylcarbamyl)-5-acetylamino benzoic acid of formula is useful as a radiographic opacifier.

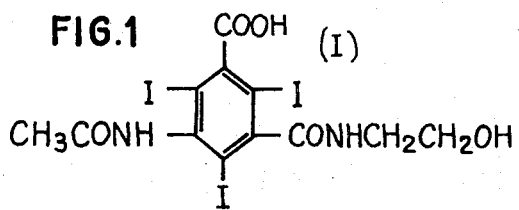
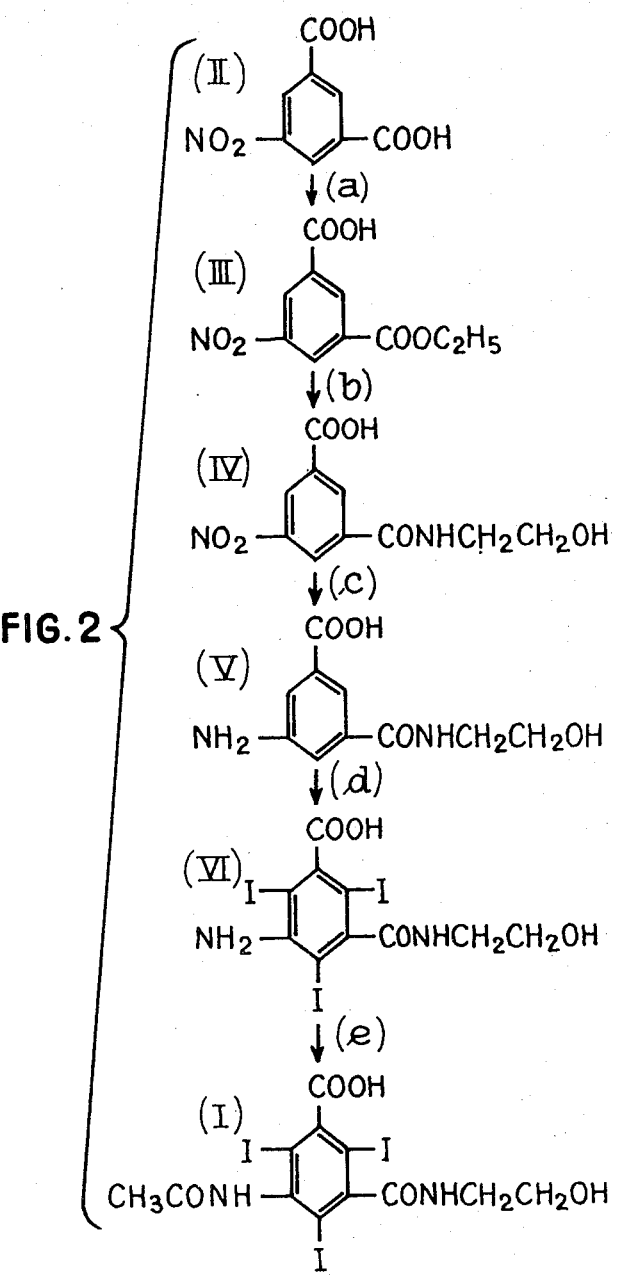

NEW BENZOIC ACID DERIVATIVES

The present invention relates to a new benzoic acid derivative and to a process for preparing the same.

This new derivative exhibits properties which make it particularly useful as a radiographic opacifier and especially for urography and angiography.

The invention has for its object a new derivative of formula I illustrated in FIG. 1 of the accompanying drawing.

The invention contemplates also within its scope an opacifying material particularly characterized in that it comprises, as active principle, 2,4,6-triiodo-3-(N-hydroxyethylcarbamyl)-5-acetylamino benzoic acid of formula I illustrated in FIG. 1 of the accompanying drawing.

This acid may be used in free form, in salt form or as a mixture of salts, or in the form of lower alkyl ester.

Acid (I) is a new compound with a melting point of 349° C. and an iodine content of 59.16 percent.

Finally, the invention is also concerned with a process for the preparation of 2,4,6-triiodo-3-(N-hydroxyethylcarbamyl)-5-acetylamino benzoic acid of formula I, of a lower alkyl ester thereof, or of the salts or salt mixtures thereof, said process comprising effecting a semiesterification of 5-nitroisophthalic acid with a lower alkanol such as ethanol, reacting the resulting monoester with monoethanolamine, thereby obtaining 3-(N-hydroxethylcarbamyl)-5-nitrobenzoic acid, reducing said nitro acid into the corresponding amino acid, iodinating said acid and acetylating the amino group of the iodinated acid.

The successive steps of the process according to the invention are illustrated in FIG. 2 of the accompanying drawing.

To obtain a maximum yield in monoester, the semiesterification is carried out under determined time, temperature and acidity conditions. Thus, particularly advantageous results are obtained in 1.5 N hydrochloric medium, during a period of time of 7 hours.

The reaction of monoethanolamine with the resulting monoester is advantageously carried out in aqueous medium, at 50°–90° C.

The reduction of the nitro group into amino group may be effected chemically or catalytically.

The subsequent iodination is effected according to the usual methods for the halogenation of benzene nuclei, particularly by action of iodine chloride in acidic medium.

Finally, acetylation of the amino group is effected using any suitable acetylating agent, such as acetic chloride or anhydride. This acetylation being capable of involving also the alcohol function of the N-hydroxyethylcarbamyl group, it will be advantageous to effect subsequently a moderate alkaline hydrolysis to regenerate the eventually acetylated group without deacylating the amino group.

The following example illustrates the preparative process according to the invention, the operating steps and resulting compounds being referred to according to the indications in FIG. 2.

EXAMPLE a. Monoethyl 5-nitroisophthalate (III)

422 g. (2 M) of 5-nitroisophthalic acid (II) are dissolved at 50° C. in 1,470 ml. of 1.5 N ethanolic hydrochloric acid solution.

The mixture is stirred at a temperature of 50° C. during 7 hours.

A solution of 350 g. of sodium chloride in 3 liters of water is then added thereto. An oily liquid separates and crystallizes on cooling. The precipitate is suction filtered. It is then washed with water until neutral. It is then suspended in 1.5 liters of 9 percent sodium bicarbonate solution. After stirring during 1 hour, the solution is filtered and acidified by addition of a dilute hydrochloric acid solution, to a pH of 4. The monoethyl 5-nitroisophthalate precipitate is suction filtered, washed with water, dried and recrystallized from ethanol.

m.p.=162° C.   Dry weight=212 g.   Yield=47%
Neutral equivalent=238

The bicarbonate solution-insoluble solid is diethyl 5-nitroisophthalate It may be saponified into 5-nitroisopthalic acid by boiling in 2 N sodium hydroxide followed by acidification to pH 1. The unreacted 5-nitroisophthalic acid may be obtained from the precipitation mother-liquors, after acidifying to pH 1 and suction filtering. The combined diacid collected represents 190 g. of a product which may naturally be recycled.

b. 3-(N-hydroxyethylcarbomyl)-5-nitrobenzoic acid (IV)

239 g. of (III) are added to 405 ml. of aqueous 30 percent ethanolamine solution (2 M). After heating for 3 hours at 70° C., 250 ml. of water are poured into this solution, and, after stirring for a further ½-hour in the presence of charcoal, the material is filtered. The filtrate is acidified to pH 3.2 by means of a dilute sulfuric acid solution. The precipitate is suction filtered, washed and dried. Product (IV). m.p.=186° C. Dry weight=200 g. Yield=79%
Neutral equivalent=252 c. 3-(N-hydroxethylcarbamyl)-5-aminobenzoic acid hydrochloride (V).

At ordinary temperature and with stirring, 127 g. of (IV) are added to 235 ml. of 40 percent ammonium sulfide solution in such a manner that the temperature does not exceed 40° C. After stirring during 3 hours, the solution heated to 100° C. is subjected to a steam entrainment of the ammonia and excess ammonium sulfide. The solution is then made acidic to pH 1 using a concentrated hydrochloric acid solution in steam which removes the sulfur dioxide formed. The sulfur is suction filtered in the hot. Product (V) crystallizes on cooling. It is then suction filtered and dried.

m.p.=205° C.   Weight=90,3 g.   Yield=78% d. 2,4,6-triiodo-3-(N-hydroxyethylcarbamyl)-5-aminobenzoic acid 52.1 g. of (V) (0.2 M) are dissolved in 460 ml. of aqueous 0.5 N hydrochloric acid solution.

To this solution are added, at a temperature of 40° C., 136 ml. of iodine chloride solution containing 70 percent iodine w./v. This solution was initially prepared by dilution of anhydrous iodine chloride in a 60 percent hydrochloric acid solution.

This solution is then heated with stirring at 85° C. during 1½ hours, and then at 95° C. overnight.

Excess mineral iodine is converted to sodium iodide by addition of a sodium bisulfite solution.

Product (VI) is suction filtered, washed with water and dried.

m.p.=246° C.   Weight=110 g.   Yield=90%
Iodine content: Found theory 0.95% 1.2% e. 2,4,6-triiodo-3-(N-hydroxyethylcarbamyl)-5acetylaminobenzoic acid (I)

At a temperature below 45° C., 60.2 g. of (VI) (0.1 M) are suspended in a mixture of 75 ml. of acetic anhydride and 19 ml. of acetic acid. To this mixture are gradually added, with stirring and still at a temperature below 45° C., 18.5 ml. of concentrated sulfuric acid ( $d$=1.83). After stirring for 1½ hours at 45° C., the mixture is cooled. 40 ml. of ice water are then added thereto in such a manner that the temperature does not exceed 45° C., followed by about 210 ml. of concentrated ammonia solution to give a pH of about 7.

The solution is then made acidic by addition of 200 ml. of concentrated (11 N) hydrochloric acid solution.

After cooling overnight at 0° C., the gummy solid is suction filtered and washed with water.

It is then taken up by dissolution in 84 ml. of 5 N sodium hydroxide. This solution is heated three hours at 40° C. to saponify the acetic ester eventually formed with the alcohol grouping of the molecule.

After cooling, the solution is acidified with a dilute hydrochloric acid solution. The precipitated acid is suction filtered and washed with water. It is crystallized from ethanol. m.p. 345° C.

100 g. of thus prepared acid (I) are dissolved in 100 ml. of dilute ammonia. To this solution are added 450 g. of ammonium chloride and, after standing overnight, 158 g. of wet ammonium salt which has crystallized out are obtained by suction filtering.

The purified acid is prepared by dissolving the salt in water and precipitation with dilute hydrochloric acid.

m.p.=349° C.   Weight=71 g.   Purification yield=71%

Iodine content: Found : 58.8%
Theory : 59.16%
Neutral equivalent=640

The lower alkyl esters of acid (I) may be prepared by esterification with lower alkanols such as methanol and ethanol, according to conventional methods.

These esters are the full equivalents of the free acid (I) as active principle. Just like the acid, they are very poorly soluble in water. This requires the use of aqueous suspensions, when it is desired to administer these esters by the intraveinous route, which is the preferred administration.

Therefore, it is preferred to use acid (I) in the form of water-soluble salts, such as alkali metal salts (particularly sodium), or alkaline earth/salts (particularly calcium), or of organic bases (especially ethanolamine and methylglucamine).

Since it is preferred to use such salts in the form of aqueous solutions, it is unnecessary to isolate them from the aqueous medium in which they are prepared. Thus preparation comprises neutralizing acid (I) in aqueous medium with the stoichiometric amount of base. Several bases may also be used simultaneously, the resulting aqueous solution thus containing a mixture of the corresponding salts, which may be advantageous in some cases. The thus prepared salt solutions, eventually in admixture with preservatives, such as disodium calciumtetracetate, are sterilized—for example by heating at 110° C. during 10 minutes—and adjusted to pH 7.

Table I below gives the composition of various solutions thus prepared.

TABLE I

| | I, percent | Acid (I) (g.) | 2 N sodium hydroxide solution (ml.) | 2 N, N-methyl glucamine solution (ml.) | Calcium hydroxide (g.) | Anhydrous calcium chloride (g.) | Disodium calcitet- racemate (g.) | Distilled water |
|---|---|---|---|---|---|---|---|---|
| (a) | 28 | 47.4 | 0 | 36.9 | 0 | 0 | 0.01 | Q.s. 100 ml. |
| (b) | 38 | 64.2 | 49.8 | 0 | 0 | 0 | 0.01 | Q.s. 100 ml. |
| (c) | 38 | 64.2 | 19.4 | 30.4 | 0 | 0 | 0.01 | Q.s. 100 ml. |
| (d) | 38 | 64.2 | 48.4 | 0 | 0.210 | 0 | 0.01 | Q.s. 100 ml. |
| (e) | 48 | 81.1 | 63 | 0 | 0 | 0 | 0.01 | Q.s. 100 ml. |
| (f) | 48 | 81.1 | 63 | 0 | 0 | 0.40 | 0.01 | Q.s. 100 ml. |

A solution of a mixture of ethanolamine and methylglucamine salts was also prepared in the same manner:

| | I, percent | Acid (I) (g.) | 2 N ethanolamine solution (ml.) | 2 N, N-methyl-glucamine solution (ml.) | Disodium calcitet-racemate (g.) | Distilled water |
|---|---|---|---|---|---|---|
| (g) | 38 | 64.2 | 18.55 | 31.2 | 0.01 | Q.s. 100 ml. |

These solutions were submitted to a pharmacological investigation, comparatively, in some cases, with analogous iothalamic acid solution previously advocated as opacifying material. The latter acid is 2,4,6-triiodo-3-(N-methylcarbamyl)-5-acetylaminobenzoic acid and differs thus from acid (I) by the presence at 3-position of a $-CONHCH_3$ group in place of a $-CONHCH_2CH_2OH$ group.

1.-Intraveinous administration in mice:
Data are set forth in table II:

TABLE II

| Acid | Solution | I percent, q./100 ml. | Me gl. salt, q./100 ml. | Na salt, q./100 ml. | Ca salt, q./100 ml. | Viscosity at 37° C., cp. | I.V. $LD_{50}$ in mice | | | |
|---|---|---|---|---|---|---|---|---|---|---|
| | | | | | | | 0.5 ml./mn. | | 2 ml./mn. | |
| | | | | | | | Iodine/kg. | Salt/kg. | Iodine/kg. | Salt/kg |
| (I) | (a) | 28 | 61.6 | 0 | 0 | 4.4 | 8.8 | 19.4 | 5.5 | 12.1 |
| Iothalamic | (1) | 28 | 59.5 | 0 | 0 | 4.3 | 8.25 | 17.5 | 5.4 | 11.4 |
| (I) | (b) | 38 | 0 | 66.4 | 0 | 4.4 | 11.25 | 19.7 | 7.8 | 13.6 |
| Iothalamic | (2) | 38 | 0 | 63.3 | 0 | 4.3 | 12 | 20 | 7.2 | 12 |
| (I) | (c) | 38 | 51.4 | 25.7 | 0 | 8.6 | 11.5 | 23.3 | 7.7 | 15.6 |
| (I) | (d) | 38 | 0 | .63 | 3.6 | 4.4 | 13 | 21.7 | 10 | 16.7 |
| (I) | (e) | 48 | 0 | 83.6 | 0 | 9.4 | 12 | 20.9 | 7.5 | 13.1 |
| Iothalamic | (3) | 48 | 0 | 80 | 0 | 8.5 | 12 | 20 | 7.8 | 13 |
| (I) | (f) | 48 | 0 | 83.6 | [1] 0.40 | 9.4 | 12.1 | 21 | 8.75 | 15.3 |

Solution (g), which contains a mixture of N-methylglucamine and ethanolamine salts has the following characteristics:

| | | | | Ethanolamine salt, g./100 ml. | | | | | | |
|---|---|---|---|---|---|---|---|---|---|---|
| (I) | (g) | 38 | 52.4 | 26.2 | 8.2 | 12.5 | 26.8 | 7.5 | 15.5 |

[1] Solution (f) contains 0.40 q./100 ml. of calcium chloride.

The toxicity values, by the intraveinous route, in mice, are closely related for iothalamic acid and acid (I).

2.-Intracerebral administration in mice:

The solutions of methylglucamine iothalamate and of the methylglucamine salt of acid (I) were investigated comparatively by this route, according to the technique of Haley and McCormick in mice (Haley T. J. and McCormick W. G. Brit. J. Pharmacol. 1957, 12, 12–15–J. K. Kodama et col., Exp. and Molecular Path. Suppl. 1963, 2, 65–80).

The volume of each dose was 0.05 ml.

The concentration was adjusted with respect to the dose administered, the dilution was effected with distilled water.

|  | grams of iodine | Lethal dose 50 grams of salt |
| --- | --- | --- |
| Methylglucamine iothalamate | 0.12 | 0.25 |
| Methylglucamine salt of acid (I) | 0.12 | 0.26 |

3.–Influence on the arterial pressure, in dog or rabbit

Various tests were carried out at a more or less high-rate of injection (up to 12 ml./mn.) at a dosage of up to 3 g. of iodine per kg. of body weight of the animal, without any variation in the arterial pressure.

4-Intracarotid injection in rat according to H. Kutt and coll. Acta Radiologica, 1966, 5, 276

In urethane anesthetized rats of about 380 g. 0.5 ml. of a solution, with a 48 percent iodine content, of the sodium salts of acid (I) and of iothalamic acid were injected This injection was repeated at 5 minute intervals until the animal died. The reactions were noted during injection.

Contractions of the limbs and neck were noted, which increased in intensity as the injections progressed.

On the average, such contractions appear only on the fourth injection with acid (I), but as early as the first or second injection with iothalamic acid. Whatever acid was used, death occurred at the latest at about the tenth injection.

Thus, it may be said that systemic toxicity is substantially the same with acid (I) and with iothalamic acid, but that local tolerance of acid (I) is better.

The opacifying properties of acid (I) were demonstrated by the following tests:

Urography: An injection of solution (e) or (f) (see table) was effected in three rabbits, weighing 2.5–3.5 kg. which had been fasted and given no water for 24 hours prior to the test, at a rate of 12 ml./minute in the marginal ear vein.

X-ray pictures were taken 5 minutes, 10 minutes, 20 minutes, 50 minutes and 80 minutes after injection.

As early as the first X-ray picture, both the pelvis renalis and the ureters are opacified. The calices renales become visible in the later pictures, 50 to 80 minutes after injection. Opacification of the bladder is gradual and strong.

Angiography: Any vascular injection of this product results in excellent X-ray pictures of the injected vessels and of the vascular organs.

Considering the above data, acid (I), the lower alkyl esters thereof and the salts thereof are useful in human medicine–as confirmed by clinical experimentation–as opacifiers for radiological purposes. The main applications of the opacifying material according to the invention are urography and angiography, although any other radiological application may be contemplated.

Intravascular injection is the choice method of administration; however, the oral route or the retrograde route may also be used.

The preferred pharmaceutical form of the opacifying product consists of aqueous suspensions and, more preferably, of aqueous solutions of the active principle, the latter being then in the form of a salt or of a salt mixture.

The aqueous solutions contain advantageously 30 to 100 g. of salt or salt mixture per 100 ml. and the injectable amount of such solutions may be varied from 5 to 100 ml. as the case may be.

Having now described our invention what we claim as new and desire to secure by Letters Patent is:

1. A compound selected from the group consisting of 2,4,6-triiodo-3-(N-hydroxyethylcarbamyl)-5-acetylamino benzoic acid of the formula:

$$\text{CH}_3\text{CONH} - \underset{\underset{\text{I}}{\bigcirc}}{\overset{\overset{\text{COOH}}{\underset{\text{I}}{|}}}{\bigcirc}} - \text{COHNCH}_2\text{CH}_2\text{OH}$$

a lower alkyl ester thereof, an alkali metal salt thereof, an alkaline-earth metal salt thereof, the methylglucamine salt thereof and the ethanolamine salt thereof.